United States Patent [19]

Herzberg et al.

[11] 4,273,170
[45] Jun. 16, 1981

[54] PRECISION REED TRIMMING MACHINE

[75] Inventors: Norman Herzberg, 16712 Chaplin Ave., Encino, Calif. 91436; James Compton, Jr., Long Beach, Calif.

[73] Assignee: Norman Herzberg, Encino, Calif.

[21] Appl. No.: 67,330

[22] Filed: Aug. 17, 1979

[51] Int. Cl.³ .............................................. B27C 1/14
[52] U.S. Cl. .................................. 144/115; 144/2 R; 144/144 R; 144/142; 409/289; 409/292
[58] Field of Search .................. 144/2 R, 3 R, 114 R, 144/115, 134 R, 137, 144 R, 144 A, 142, 144 S, 147, 126, 162 R, 182; 409/289, 291, 292, 310

[56] References Cited

U.S. PATENT DOCUMENTS

| | | | |
|---|---|---|---|
| 2,204,871 | 6/1940 | Strano et al. | 144/142 |
| 2,664,122 | 12/1953 | Allen, Sr. | 144/144 R |
| 3,739,824 | 6/1973 | Hoenig | 144/144 R |

OTHER PUBLICATIONS

*Pfeifer Profiling Machines*, Pfeifer Double Reed Accessories, Inc., published price list, Nov. 1977, Phoenicia, N.Y., p. 3.

*Primary Examiner*—W. D. Bray

*Attorney, Agent, or Firm*—Poms, Smith, Lande & Rose

[57] ABSTRACT

An apparatus trims woodwind instrument reed material for use in bassoons and the like in a precise and efficient manner. A cylindroid section of reed material is attached to the apparatus for rotation about its longitudinal axis. A cam, journalled in parallel relation to the reed material, defines a gradient to be trimmed thereon. The reed material and cam are interlocked for rotation in fixed parallel relation. A reed cutting assembly is pivotally disposed above the reed material and the cam and is movable about the longitudinal axes thereof. The cutting assembly includes a cam follower adjacent the cam and a blade in contacting relation with the reed material. The cutting assembly trims the gradient defined by the cam onto the reed material. The trimming is done by rotating the interlocked reed support and cam assembly about the longitudinal axis of the reed material, while linearly moving the cutting assembly along the longitudinal axis of the reed material. After both halves of the reed have been trimmed to the gradient defined by the cam the precise longitudinal center of the reed material is located and the final processing of the reed material is done.

12 Claims, 10 Drawing Figures

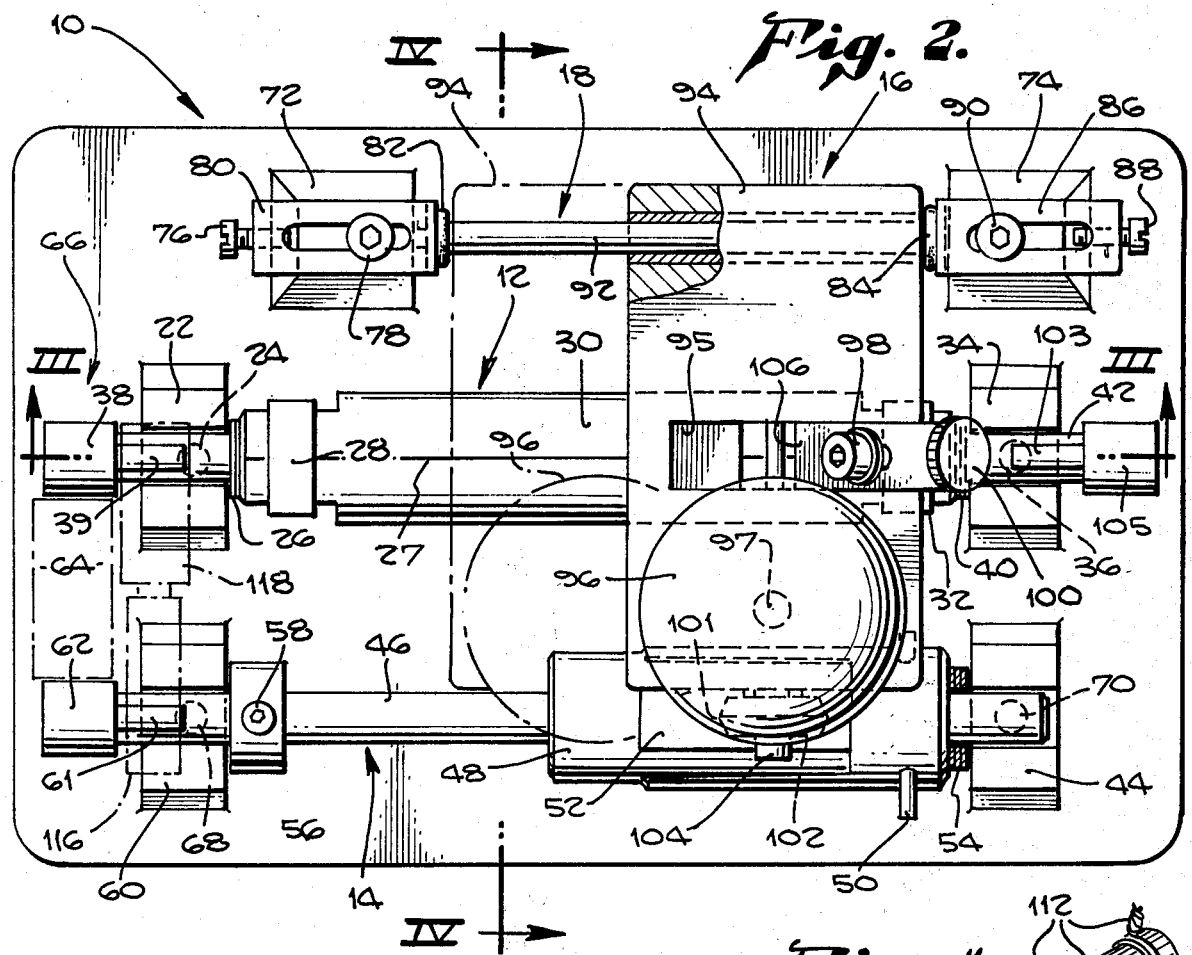

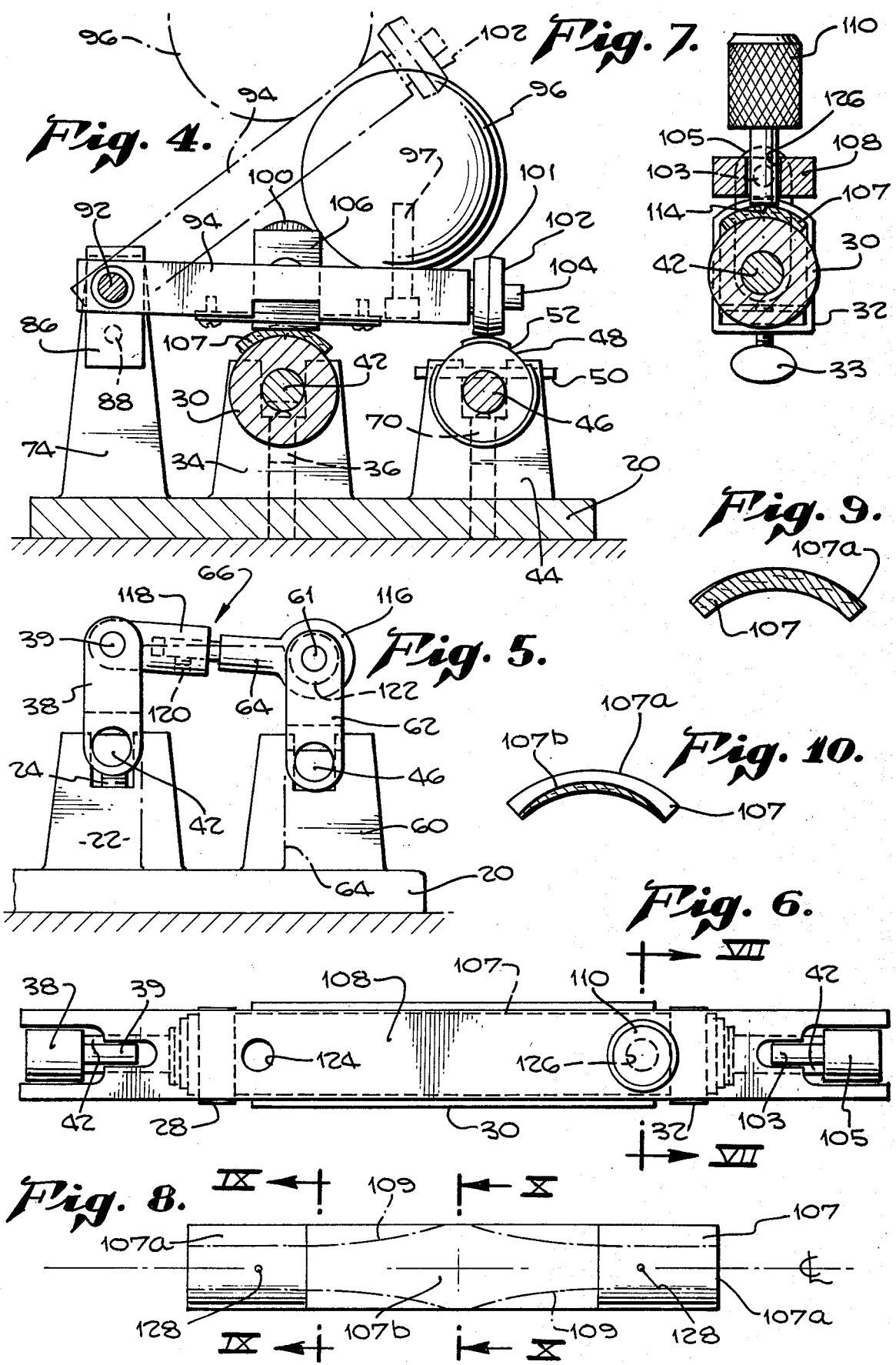

PRECISION REED TRIMMING MACHINE

FIELD OF THE INVENTION

The present invention relates in general to apparatus which trim reed material for use with woodwind instruments and, in particular, to apparatus which trim such material for use with the bassoon.

BACKGROUND OF THE INVENTION

One of the most critical parts of a woodwind instrument such as a bassoon, oboe, clarinet, or saxophone is the reed. The reed is a thin elastic tongue of reed cane, wood, plastic, or metal fastened at one end to the mouthpiece portion of the instrument and is set in vibration by the musician's breath. The mouthpiece of the bassoon is the reed itself. Most of the reed material for the bassoon mouthpiece grows generally in the Mediterranean area. Accordingly, prefabricated reeds are somewhat expensive because of limited supply of reed material. As the bassoon reeds must be replaced periodically because of age, wear, and unsuitability, many bassoon players make their own reeds in the interests of economy. Such individual fabrication also allows the reeds to be tailored to the specific needs of each musician.

A bassoon reed is difficult to make from a raw section of reed cane material, as absolute symmetry is required on opposite sides of the finished reed in order to insure proper vibration. Additionally, only a few machines exist which produce bassoon reeds and they are not only cumbersome, but they also produce reeds having imprecise tolerances. Futhermore, such machines are expensive and often beyond the financial reach of the musician. Accordingly, as professional bassoon players must have reeds uniquely shaped to their needs, many bassoon players have developed special sets of hand tools to produce these special reeds. However, production of reeds with such tools is very time-consuming and the reeds are not as accurate as desired.

Accordingly, it is the principal object of this invention to accurately trim a section of reed material for use in a woodwind instrument such as a bassoon.

It is an additional object of this invention to allow the precise tailoring of a woodwind reed to the needs of individual musicians.

It is a further object of this invention to quickly trim reeds for use in woodwind instruments.

It is a final object of this invention to economically produce woodwind instrument reeds.

SUMMARY OF THE INVENTION

The present invention, in a broad aspect, provides an apparatus for trimming woodwind instrument reeds which includes a reed support affixing a generally cylindroid section of raw reed cane material to the apparatus for rotation about its longitudinal axis. A cam adjustably journaled in parallel relation to the reed support for rotative movement about an axis parallel with the longitudinal axis of the reed defines a gradient to be trimmed onto the the reed material. The reed support and the cam are interlocked and maintained in fixed rotational relation.

Pivotally disposed above the reed support and linearly movable along the longitudinal axis of the reed material is a reed cutting assembly, which trims a gradient defined by the cam onto one-half of the reed material. The reed cutting assembly includes a cam follower rotatably attached thereto and disposed above and adjacent to the cam. The cam and cam follower control the trimming of the reed by the cutting assembly. A piece of reed material mounted upon the reed support is trimmed as the cutting assembly is moved linearly along the longitudinal axis of the material while the reed support and the cam are rotated about the longitudinal axis. The cutting of the reed material continues until the cam follower contacts the complete cam surface, which prevents the cutting assembly from removing any more of the reed material. The reed support is then removed from and remounted upon the apparatus to expose each half of the section of reed to the cutting assembly.

In accordance with one feature of the invention, the apparatus includes an alignment block insertable between the reed support and the cam whenever any vertical adjustment to the axis of rotation of the cam is being performed, which always necessitates the removal of the portion of the apparatus interlocking the cam with the reed support. The alignment block maintains the reed support and the cam in a predetermined rotational relationship until the axis adjustment is completed and the interlock mechanism itself has been reattached and adjusted so that the reed support and cam may be easily rotated.

In accordance with another feature of the invention, the apparatus includes provisions for repositioning the cam along the longitudinal axis of the reed and for adjusting the distance which the cutting assembly may be linearly moved along the longitudinal axis of the reed. These adjustments allow control over the position and length of the gradient to be trimmed onto the reed by the cutting assembly.

In accordance with still another feature of the invention, the apparatus includes provisions for vertically tilting the axis of rotation of the cam relative to the axis of rotation of the reed support to allow control over the depth of the gradient trimmed onto the reed material by the cutting assembly.

In accordance with another feature of the invention, the reed support includes an elongated cylindrical member having a rounded longitudinal surface adapted to support thereon an open, cylindroid section of reed material. The reed material is affixed to the cylindrical member by a pair of clamps. The cylindrical member is supported upon the apparatus by a pair of adjustable bearings in a manner allowing freely rotative movement about its longitudinal axis.

In accordance with a further feature of the invention, the cam includes a generally cylindrical cam member having an elongated, cylindroidal camming surface relative to the longitudinal axis of the reed. The camming surface is inclined and includes portions with varying rates of angular change to effect the desired shape of the reed. Setscrews containing bearings support the cam member upon the apparatus in a manner allowing rotative movement about the longitudinal axis of the cam member. The setscrews are vertically adjustable and allow the tilting of the axis of rotation of the cam member relative to the reed, thereby controlling the depth of the gradient shaped onto the reed section. The cam member is also longitudinally shiftable relative to the reed support, thereby allowing control over the position of the gradient trimmed onto the piece of reed material.

In accordance with still another feature of the invention, the cam member and reed support member are maintained in fixed rotational relation by an adjustable link member rotatably attached therebetween.

In accordance with another feature of the invention, the reed cutting assembly includes an axle member journaled on the apparatus in parallel relation to the longitudinal axes of the reed support member and the cam member. A cutting platform rotatably attached to the axle member for linear movement therealong supports a cutting blade disposed above the section of reed. The cutting blade cuts the gradient defined by the cam surface into the section of reed material. The vertical height of the blade is adjustable in order to control the thickness of the shavings from the reed material. A handle attached to the cutting platform facilitates movement thereof relative to the reed.

Contact between the cam member and the cutting platform is made by means of the cam follower rotatably attached to the cutting platform in parallel alignment with the contact point of the cutting blade and the reed section. To trim the reed section, the cutting platform is moved linearly along the longitudinal axis of the reed material, as the reed support and cam member are rotated about the longitudinal axis of the reed material, until the cam follower makes contact with all portions of the cam surface. Contact between the cam and cam follower prevents the cutting blade from removing any more of the reed material. In this manner, the cam controls the cutting of the reed section by the cutting blade. The linear displacement of the cutting platform along the axle member is adjustable to control the length of the gradient trimmed onto the reed.

In accordance with a final feature of the invention, after the section reed material has been trimmed, its longitudinal center is determined by means of a centering line on the reed support or by a bar member adapted to be placed over the reed support member after removal from the apparatus. The bar member has a pair of guide holes in precise alignment with the central longitudinal axis of the reed support member. A scribe is inserted either into the bar holes or adjacent the line to indent the section of reed in two places. After the indentation has been done, a line is drawn through the indentations. The final processing of the section reed material is then performed by other devices not forming a part of the present invention.

Other objects, features, and advantages of the present invention will become apparent from a consideration of the following detailed description and from the accompanying drawings.

BRIEF DESCRIPTION OF THE DRAWINGS

FIG. 1 is a perspective view of a finished woodwind instrument reed, having first been trimmed by the apparatus of the present invention and then shaped by other devices not forming a part of the present invention;

FIG. 2 is a top plan view of an exemplary embodiment of an apparatus for trimming woodwind instrument reeds according to this invention;

FIG. 3 shows a cross sectional view of the apparatus shown in FIG. 2, taken through plane III—III;

FIG. 4 shows a cross sectional view of the apparatus shown in FIG. 2, taken through plane IV—IV;

FIG. 5 shows a cross sectional view of the apparatus shown in FIG. 3, taken through plane V—V;

FIG. 6 shows an auxiliary portion of the apparatus of the present invention, said portion being used to mark a reed after trimming by the apparatus shown in FIG. 2;

FIG. 7 is a cross sectional view of the portion of the apparatus shown in FIG. 6, taken through plane VII—VII;

FIG. 8 shows a woodwind instrument reed as trimmed by the apparatus shown in FIG. 2 and as marked by the apparatus shown in FIG. 6;

FIG. 9 is a cross sectional view of the woodwind reed shown in FIG. 8, taken through plane IX—IX; and FIG. 10 is a cross sectional view of the woodwind reed shown in FIG. 8, taken through plane X—X.

DETAILED DESCRIPTION

Referring now to the drawings and particularly to FIG. 2, an exemplary embodiment of the apparatus for trimming woodwind instrument reeds according to this invention is generally denoted by the numeral 10. The apparatus includes a reed support assembly, generally denoted 12; a cam assembly, generally denoted 14; a cutting head assembly, generally denoted 16; a cutting head support assembly, generally denoted 18; and a linking assembly, generally denoted 66 positioned between the reed support assembly 12 and the cam assembly 14.

The apparatus of the present invention is designed to take a quarter-round of third-round cylindroid section of reed material and appropriately trim it for use as a woodwind instrument reed. It is to be noted that the term reed material as used herein, refers to reed cane, plastic, teflon, or any other material used to construct woodwind reeds. The apparatus of the present invention is particularly adapted to trim a section of reed cane material for use with the bassoon.

FIGS. 8–10 show the trimming produced by the apparatus. FIG. 8 shows a cylindroid section of reed 107. The complete inner surface and outer end portions of the reed material remain unaffected during shaping process. Prior to shaping, the section of the reed 107 is of a uniform thickness throughout its entire length. This thickness is shown in FIG. 9. The processing of the section of reed material 107 by the apparatus trims a gradient onto the central section of the reed 107. The gradient is inclined and generally cylindroidal, but employs different rates of angular change across the surface to effect the desired results. After processing, and as shown in FIGS. 9 and 10, the reed 107 maintains its original thickness 107a at each end. The central section of the reed 107b decreases to a minimum thickness for what will be the mouthpiece portion of the finished reed. This minimum thickness allows proper vibration of the reed.

FIG. 1 shows a complete finished reed. After the reed 107 has been processed by the apparatus, it is folded about the plane X—X over a shaping tool, with the thin central section 107b exposed. The reed is then shaped along the dotted lines 109 shown in FIG. 8 to have the form shown in FIG. 1. After the shaping has been done, the thick ends 107a of the reed are scored, placed over a thin rod and bound with wire 103. A slight portion of the midsection of the folded reed 107b is then removed to open the mouthpiece portion of the reed. The present invention is only concerned with the trimming of the reed up to the stage depicted in FIG. 8 and does not relate to the subsequent shaping of the sides to produce the finished reed shown in FIG. 1.

Regarding the specific construction of the apparatus 10, and as shown in FIGS. 2 and 3, the reed support assembly 12 includes a generally cylindrical reed support member 30 removably journaled by means of an axle member 42 to two supports 22 and 34 extending vertically from the apparatus base 20. A plurality of shims 26 and 40 are placed upon the axle member 42 to remove any "play" in the reed support member 30 relative to the vertical supports 22 and 34. Additionally, at each end of the axle member 42 is a generally rectangular alignment guide 38 and 105. The guides 38 and 105 are affixed to the axle member 42 by a pair of setscrews 41 and 43 and dowel pins 45 and 47. The alignment guides 38 and 105 and the guide pins 39 and 103 extending therefrom are utilized with the portion of the apparatus shown in FIG. 6 to determine the precise longitudinal center of the reed material, and are also utilized with the linking assembly 66.

As shown in FIG. 3, the axle member 42 attached to the reed support member 30 is journaled upon the vertical supports 22 and 34 by means of setscrews 24 and 36 within the supports. The setscrews 24 and 36 contain bearings in contact with the reed support member 30 and are positionable vertically to tilt the longitudinal axis of rotation of the reed support member 30 with respect to the base 20 of the apparatus to allow additional control over the dimensions of the gradient cut into the head.

As shown in FIGS. 3 and 4, the reed support member 30 has a rounded upper section adapted to support an open quarter-round or third-round cylindroid section of reed material 107 for trimming by the apparatus. The reed material 107 is attached to the reed support member 30 by a pair of clamps 28 and 32 which are positioned at each end thereof. A pair of thumbscrews 29 and 33 in the clamps 28 and 32 are utilized to tightly affix the reed section 107 to the reed support member 30.

The cam assembly 14 defines the depth and shape of the gradient to be cut into the section of reed material 107. The cam assembly 14 includes a generally cylindrical cam member 48 attached to an axle member 46 by means of a guide pin 50 and a setscrew 49. The axle member 46 is in precise parallel alignment with the other axle member 42 attached to the reed support member 30. As will be discussed, the precise parallel positioning is initially determined by an alignment block 64 and is maintained by the linking assembly 66. The guide pin 50 engages a flattened portion of the axle member 46 and prevents axial displacement of the cam member 48 therealong. The setscrew 49 provides the same function. The axle member 46 is rotatably journaled upon two setscrews 68 and 70 within a pair of vertical supports 44 and 60 extending upwardly from the base 20. The setscrews 68 and 70 contain bearings in contact with the cam member 48 and are adjustable to control the vertical orientation of the axis about which the cam member 48 rotates.

The axial position of the axle member 46 relative to the vertical supports 44 and 60 is maintained by a locking ring 56 and setscrew 58 assembly at one end of the axle member 46 and by a plurality of shims 54 adjacent at the other end of the axle 46. As the axial position of the cam member 48 is varied relative to the axle member 46 by means of the setscrew 49 and guide pin 50, the shims 54 are used to prevent "play" in the cam member 48 relative to the vertical supports 44 and 60. The repositioning of the cam member 48 shifts the location of the gradient trimmed onto the reed material 107.

The shape of the gradient trimmed into reed 107 is determined by a cam surface 52 on the cam member 48. This surface 52 is generally cylindroidal and inclined along the cam member 48, with the highest part of the surface 52 being adjacent the end of the cam member 48 closest to the shims 54. The surface 52 decreases away from the shims 54 at different angular rates to effect the proper trimming of the reed material 107. By controlling the gradient trimmed onto the reed 107, the cam surface 52 controls the various thicknesses of the mouthpiece portion 107b of the finished woodwind reed shown in FIG. 1.

The actual trimming of the reed 107 affixed to the reed support member 30 is done by the cutting head assembly 16 mounted to the support assembly 18 on the apparatus base 20. The cutting head assembly 16 includes a cutting platform 94 to which is attached by means of a setscrew 98, a cutting blade 106. A thumbscrew 100 is used to adjust the depth of the blade 106, which controls the thickness of the shavings trimmed from the reed material. Also attached to the cutting platform 94, by means of a pin 104, is a cam follower 102. The cam follower 102 is in parallel orientation with the point at which the cutting blade 106 makes contact with the reed section 107. The cam follower freely rotates about the pin 104. A beveled edge 101 of the cam follower 102 makes contact with the cam surface 52 after the reed material 107 has been properly trimmed. In this manner, the gradient defined by the cam surface 52 is transferred onto the reed material 107.

The cutting platform 94 is rotatably attached to the cutting head support assembly 18. The support assembly 18 includes a rod 92 journaled upon two vertical supports 72 and 74 extending upwardly from the base 20. The rod 92 is in precise parallel alignment with the longitudinal axes of rotation of the reed support member 30 and the cam member 48. The cutting platform 94 is manually moved along the rod 92 by a ball-shaped handle member 96 attached to the cutting platform 94 by a screw 97. A pair of moveable brackets 80 and 86 are attached to the vertical supports 72 and 74 by means of a pair of screws 78 and 90. One bracket 86 controls the distance the cutting platform 94 may move along the rod 92, and thus controls the length of the gradient trimmed onto the reed material 107. The other bracket 80 determines the stopping point for the cutting platform 94 relative to the center of the reed material, and thus defines point of minimum thickness for the trimmed reed 107. The brackets are adjusted by four screws 76, 78, 88, 90. A pair of grommets 82 and 84 positioned upon the rod 92 cushion the impact of the cutting platform 94 against the brackets 80 and 86 as the limits of travel along the rod 92 are reached.

The trimming of any longitudinal portion the reed material 107 by the cutting head assembly 16 is done by moving the cutting platform 94 linearly along the rod 92 by means of the handle 96. As this occurs, portions of the reed 107 are shaved away by the blade 106. The shavings of reed material 107 pass through an opening 95 in the cutting platform 94. The shaving continues until contact between the beveled edge 101 of the cam follower 102 and the cam surface 52 is established for the complete cam surface 52. When this occurs, the blade 106 can no longer cut into the reed 107. Thus, the gradient defined by the camming surface 52 is transferred onto the reed 107.

In order to trim the complete surface of the cylindroid reed section 107 as the cutting platform 94 is moved along its supporting rod 92, the cam member 48 and the reed support member 30 are rotated in unison about their longitudinal axes by means of the linking assembly 66. The particular configuration of the linking assembly utilized is commonly referred to as a "heim joint." The linking assembly 66 is attached to the alignment guide 38 at one end of the axle 42 supporting the portion of the reed support member 30 and to a similar guide 62 at one end of the axle 46 supporting the cam member 48. As is shown most clearly in FIG. 5, the linking assembly 66 includes two portions 116 and 118, attached to pins 61 and 39 on the guides 62 and 38. A rotatable bearing 122 is utilized with the second pin 61 to allow precise rotation of the cam member 48 and the reed support member 30 when the longitudinal axis of the cam assembly 14 has been vertically altered by means of the adjustable bearings 68 and 70. As is seen in FIG. 5, the left and right portions 118 and 116 of the linking assembly 66 are adjustable by means of a setscrew 120 in the linking assembly 66.

Thus, as the reed material 107 attached to the reed support member 30 is trimmed, the link assembly 66 is slowly pivoted while the cutting assembly 94 is being moved along the reed 107. In this manner, the complete surface of the cylindroid reed section 107 has shaped onto it the gradient defined by the cam surface 52. As the reed 107 cannot be completely shaped with a single pass of the cutting head assembly 16 as the reed support member 30 and cam member 48 are rotated, several passes with the cutting head assembly 16 are made in each position of rotation of the supporting assembly 12 and the cam assembly 14 until contact is made between the beveled edge 101 of the cam follower 102 and all portions of the cam surface 52.

As is seen from FIG. 3, the particular disposition of the cutting blade 106 only allows one-half of the reed 107 to be trimmed at a time. That is, with the reed material 107 mounted as shown in FIG. 3, only the portion of the reed 107 to the right of plane X—X in FIG. 8 would be appropriately trimmed. Accordingly, after this half of the reed has been trimmed, the linking assembly 66 is removed from the pins 39 and 61, the cutting platform 94 is pivoted away from the reed 107, and the complete reed support member 30 is removed from the vertical supports 22 and 34. The reed support member 30 is then pivoted to place the untrimmed portion of the reed beneath the cutting platform 94, and the reed support member 30 is then repositioned in the vertical supports 22 and 34. After reattachment of the linking assembly 66 to the guide pin 61 attached to the axle 46 supporting the member 48 and to the previously unused guide pin 103 attached to the alignment guide 105 at the other end of the reed supporting axle 40, the process is repeated. That is, the cutting assembly 94 is manually moved by means of the handle 96 along the longitudinal axis of the reed 107 as the reed supporting member 30 and the cam member 48 are pivoted by means of the linking assembly 66.

Trimming the other half of the reed 107 produces a reed as shown in FIGS. 8–10. Thus, the apparatus leaves the end portions 107a of the reed 107 undisturbed, while shaping the central section 107b to the gradient defined by the cam surface 52.

In order for the further processing of the trimmed reed 107 to occur prior to the reed being completely ready for use with a woodwind instrument such as a bassoon, as shown in FIG. 1, the precise longitudinal center of the finished reed section 107 must be determined. The present invention provides two methods for performing this task.

With the first method, after the trimming of the reed section 107 has been completed, the linking assembly 66 is removed from the guide pins 103 and 61 and the complete reed support member 30 is removed from its vertical supports 22 and 34 with the reed section 107 still clamped thereto. The reed support member 30 is then manually supported while a centering bar 108 is fitted over the guides 38 and 105 at each end of the axle member 42. The guides pins 39 and 103 assist in the alignment of the centering bar 108 on the guides 38 and 105. After the centering bar 108 has been properly placed upon the blocks 38 and 105, the precise longitudinal center of the reed 107 is determined by means of the insertion a scribe 110 into a pair of holes 124 and 126 in the centering bar 108. The scribe 110 has a sharp pointed end 114 which is pressed into the reed 107 to make a pair of indentations 128 defining the center of the reed 107. The centering bar 108 is then removed from the blocks 38 and 105 and a line is then drawn through these indentations 128 with a ruler and pen or similar means. The reed 107 is then removed from the clamps 28 and 32.

With the second method, the scribe 110 is used to indent the end portions of the reed 107 adjacent an engraved line 27 on the reed supporting member 30. The line 27 is positioned in the central upper surface of the reed supporting member 30. After the indentations 128 have been made, a line is again drawn through them and the reed 107 is removed from the clamps 28 and 32. The second method yields comparable results with the first method and the choice of which one is used is primarily a matter of convenience.

After the longitudinal center of the reed section 107 has been determined and the reed material has been removed from the reed support member 30, the reed 107 is folded about its transverse center, as defined by plane X—X in FIG. 8, for further work. This work includes the fitting of the folded reed section 107 over a shaping guide having a shape defined by the dotted lines 109 in FIG. 8, and the shaping the edges of the reed section to these lines 109. After this has been done, the end portions 107a of the reed 107 are longitudinally scribed, as shown at 108. The reed 107 is then placed over a small rounded rod and the ends 107a are then bound together with a plurality of bands of wire 103. After the wires 103 have been attached, the folded end of the reed is cut off slightly past the fold and the reed shown in FIG. 1 results. It should be noted that the various apparatus used to form the finished reed after removal from the reed support member are not part of this invention and consequently have not been shown in the drawings.

As can be seen from the above description, the apparatus of the present invention allows the precise trimming of a reed for eventual use as the mouthpiece for a woodwind instrument. The various adjustments on the apparatus allow the reed thickness shape to be precisely tailored to the needs of the musician. That is, the length of the trimmed section of the reed 107b can be changed by appropriate axial repositioning of the cam member 48, or the bracket 86 controlling the degree of travel of the cutting assembly 94. Similarly, the angle of the gradiant cut into the reed 107b may be varied by repositioning the adjustable bearing assemblies upon which the cam assembly 14 is journalled. Also, the longitudinal positioning of the gradient trimmed onto the reed 107 may also be altered by the axial repositioning of the cam member 48.

In order to maintain the precise rotational relationship between the reed support member 30 and the cam member 48 when the longitudinal axis of rotation of the cam member 48 is being vertically altered, an alignment block 64 is placed between the guides 38 and 62 while the adjustment is being performed. The alignment block 64 maintains the reed support member 30 and the cam member 48 in a predetermined rotational relationship as the adjustment is made. The final step of any adjustment is to adjust the linking assembly for a smooth fit over the guide pins 39 and 61. The block 64 is removed after all the adjustments have been completed.

As is seen, the present invention allows precise woodwind reeds for bassoons and the like to be quickly and easily constructed. With the apparatus of the present invention, a finished woodwind reed may be made from a piece of reed material in as little as 15 minutes. Additionally, because of the limited number of components therein, the apparatus invention may be fabricated at a very reasonable cost. These features represent a significant advance over the machines previously employed to make woodwind reeds, which are generally very costly, inaccurate, and cumbersome to use.

In the foregoing description of the present invention, a preferred embodiment of the invention has been disclosed. It is to be understood that the mechanical and design variations are within the scope of the present invention. Thus, by way of example and not of limitation, the blade portion of the apparatus could be replaced by other reed cutting means such as a power-driven mechanism with a diamond-cutting tip; different means could be utilized to adjust the relative positions of the cutting head support, reed support, and cam assemblies; and the cam and cam follower could be arranged differently to achieve the same result. Accordingly, the invention is not limited to the particular arrangement which has been illustrated and described in detail herein.

What is claimed is:

1. In an apparatus for trimming woodwind instrument reeds of the type having:
   (a) reed supporting means for supporting a generally cylindroidal section of reed material and for allowing said reed section to rotate about its longitudinal axis, said supporting means being removable from said apparatus;
   (b) cam means, journalled in parallel relation to said supporting means, for rotative movement about an axis parallel with said longitudinal axis of said reed section, for defining a gradient to be trimmed onto said reed section; and
   (c) reed cutting means, pivotally disposed above said supporting means and linearly moveable along said longitudinal axis of said reed section, for trimming said gradient onto one half of said reed section, said reed cutting means including cam following means, rotatably attached to said reed cutting means and disposed adjacent to said cam means, for controlling the trimming of said reed by said cutting means, whereby a reed section mounted upon said supporting means is trimmed by the linear movement of said cutting means along said longitudinal axis of said reed section, as said supporting means and said cam means are rotated about said axis, until said cam following means completely contacts said cam means, whereupon said supporting means is removed from and remounted upon said apparatus to expose both halves of said reed section to said cutting means;

the improvement comprising:
   (1) adjustable means, interlocking said supporting means and said cam means, for adjustably maintaining said supporting means and said cam means in a precise fixed rotational relation as said reed is trimmed;
   (2) means for vertically changing the axis of rotation of said cam means relative to said supporting means, thereby controlling the depth of said gradient trimmed onto said reed section;
   (3) means for determining the precise longitudinal center of said trimmed reed; and
   (4) means for orienting said supporting means and said cam means in a precise predetermined rotational relationship when the rotational axis of said cam means is vertically altered by means of said changing means.

2. An apparatus for trimming woodwind instrument reeds as defined in claim 1, wherein said improvement further comprises:
   means for repositioning said cam means along said longitudinal axis of said reed section, thereby controlling the length and longitudinal position of said gradient trimmed onto said reed section.

3. An apparatus for trimming woodwind instrument reeds as defined in claim 1, wherein said apparatus further comprises:
   means for adjusting the thickness of material removed from said reed section by said cutting means as said reed section is trimmed.

4. An apparatus for trimming woodwind instrument reeds as defined in claim 1, wherein said apparatus further comprises:
   means for adjusting the distance said cutting means linearly moves along said longitudinal axis of said reed section, thereby controlling the length of said gradient to be shaped onto said reed.

5. An apparatus for trimming woodwind instrument reeds as defined in claim 1, wherein:
   said reed supporting means comprises:
   (a) a generally cylindrical member having a rounded longitudinal surface adapted to support thereon an cylindroid section of reed material and having two end sections connected to said cylindrical member; and
   (b) clamp means for affixing said section of reed upon said rounded surface; and
   said improvement further comprises:
   (1) adjustable bearing means for bearing said ends of said cylindrical member said apparatus in a manner allowing rotative movement along the longitudinal axis of said cylindrical member.

6. An apparatus for trimming woodwind instrument reeds as defined in claim 1, wherein:
   said cam means comprises a generally cylindrical cam member having an cylindroidal and inclined camming surface relative to said longitudinal axis of said reed; and
   said means for vertically changing comprises: adjustable bearing means for bearing said cam member upon said apparatus in a manner allowing freely rotative movement along the longitudinal axis thereof, and for tilting the axis of rotation of said cam member relative to said reed section, thereby controlling the depth of said gradient trimmed onto said reed section; and said improvement further comprises means for shifting the longitudinal position of said cam member relative to said reed supporting means, thereby controlling the length and placement of said gradient trimmed onto said reed.

7. An apparatus for trimming woodwind instrument reeds as defined in claim 1, wherein said adjustable means for maintaining said supporting means and said cam means in fixed rotational relation comprises:

an adjustable link member rotatably attached to said supporting means and to said cam means.

8. An apparatus for trimming woodwind instrument reeds as defined in claim 1, wherein said reed cutting means comprises:

an axle member journalled on said apparatus in precise parallel relation to the longitudinal axis of said reed supporting means;

a cutting platform rotatably attached to said axle member for linear movement therealong;

cutting blade means, mounted to said cutting platform and disposed above said reed section, for cutting said gradient into said reed section;

positioning means for controlling the cutting depth of said blade means thereby controlling the thickness of material removed from said reed section;

handle means, attached to said cutting platform, for facilitating movement of said cutting platform relative to said reed;

cam following means, rotatably attached to said cutting platform and contacting cam means when said reed section has been trimmed, for controlling said cutting of said reed section by said cutting blade means;

limit means, attached to said axle member, for limiting the movement of said cutting platform therealong, thereby controlling the length of said gradient shaped onto said reed section.

9. An apparatus for trimming woodwind instrument reeds as defined in claim 1, wherein said means for defining the precise longitudinal center of said shaped reed comprises:

engraved line means, located on said reed supporting means beneath said longitudinal axis of said reed section and extending past said reed section, for defining the center of said reed section; and scribe means for indenting said reed section adjacent said line means in a manner defining the central longitudinal axis thereof.

10. An apparatus for trimming woodwind instrument reeds as defined in claim 1, wherein said means for defining the precise longitudinal center of said shaped reed comprises:

a bar member, adapted to be placed over said reed section in alignment with the central longitudinal axis thereof, with said section being affixed to said supporting means, said bar member including a pair of guide holes centrally disposed over said longitudinal axis; and scribe means, adapted to be positioned in said guide holes, for indenting said reed section in a manner defining the central longitudinal axis thereof.

11. An apparatus for trimming woodwind instrument reeds as defined in claim 1, wherein said means for orienting comprises:

a rectangular block member positioned between said supporting means and said cam means to maintain said supporting means and said cam means in a fixed predetermined relationship as said rotational axis of said cam means is vertically altered and said adjusting means is adjusted in response thereto.

12. An apparatus for trimming woodwind instrument reeds as as defined in claim 1, wherein said means for defining the precise longitudinal center of said shaped reed comprises:

means on said reed support means contacting the under side of said reed section, for indicating the center of said reed section.

* * * * *